Figure 1:
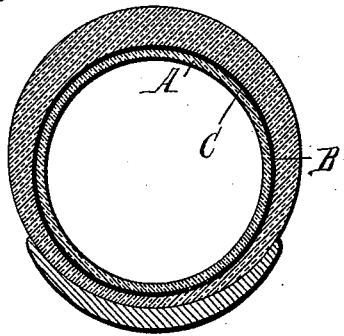

(No Model.) 2 Sheets—Sheet 1.

W. A. WARREN.
PNEUMATIC TIRE.

No. 536,363. Patented Mar. 26, 1895.

WITNESSES:
Emil Neuhart
Theo. L. Popp

W. A. Warren
By Wilhelm Bonner

INVENTOR

ATTORNEYS (No Model.) 2 Sheets—Sheet 2.
W. A. WARREN.
PNEUMATIC TIRE.

No. 536,363. Patented Mar. 26, 1895.

WITNESSES: W. A. Warren INVENTOR
By Wilhelm Bonner ATTORNEYS

UNITED STATES PATENT OFFICE.

WILLARD A. WARREN, OF BUFFALO, NEW YORK, ASSIGNOR OF ONE-HALF TO MELVIN F. WARREN, OF SAME PLACE.

PNEUMATIC TIRE.

SPECIFICATION forming part of Letters Patent No. 536,363, dated March 26, 1895.

Application filed December 21, 1893. Serial No. 494,264. (No model.)

*To all whom it may concern:*

Be it known that I, WILLARD A. WARREN, a citizen of the United States, residing at the city of Buffalo, in the county of Erie and State of New York, have invented a new and useful Improvement in Pneumatic Tires, of which the following is a specification.

My invention has more especial reference to the fabric which is employed for reinforcing the inflatable air tubes of pneumatic tires and for lining the rubber sheaths or coverings of such air tubes. Ordinary webbing or canvas has generally been used for this purpose and in order to utilize the stretching capacity of the canvas to the best advantage, it has been customary to cut the same on the bias, so that the threads extend diagonally across the tire. The same result, in a higher measure, has been obtained by winding a number of cords or narrow strips of fabric spirally around the inflatable air tube in such a manner that the windings of one cord run in an opposite direction to those of the contiguous cord. This reinforcing cover or lining, while rendering the tire sufficiently resilient to pass over ordinary obstructions with little or no jar, is unsatisfactory owing to the difficulty of repairing the inflatable air tube and its unfitness for a split sheath or so called "clinch tire," in which the edges of the sheath are provided with fastenings which interlock with hooks or flanges on the wheel rim. It has also been proposed to increase the stretching capacity of such reinforcing canvas or lining in the longitudinal direction of the tread of the tire by omitting the warp threads along the tread portion leaving only the transverse weft threads running at right angles to the warp. Such a fabric, while applicable to a split or clinch tire, is undesirable, because in passing over an obstruction, the inner air tube is liable to be crowded between the weft threads at the indented portion of the tire and become cut or ruptured.

The object of my invention is to provide a reinforcing fabric or lining for pneumatic tires which is as resilient as a fabric composed of spirally and oppositely wound cords or strips and which is at the same time free from the objectionable features of such a fabric as well as the other tire-fabrics before referred to.

To that end, my improvement consists essentially of a warpless reinforcing fabric having diagonal weft threads which are interwoven with selvages or marginal threads.

Figure 3:
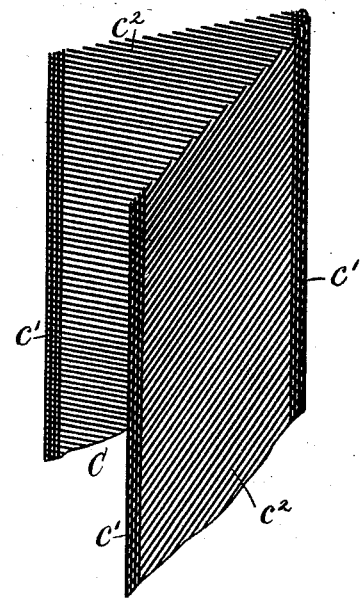
Figure 2:
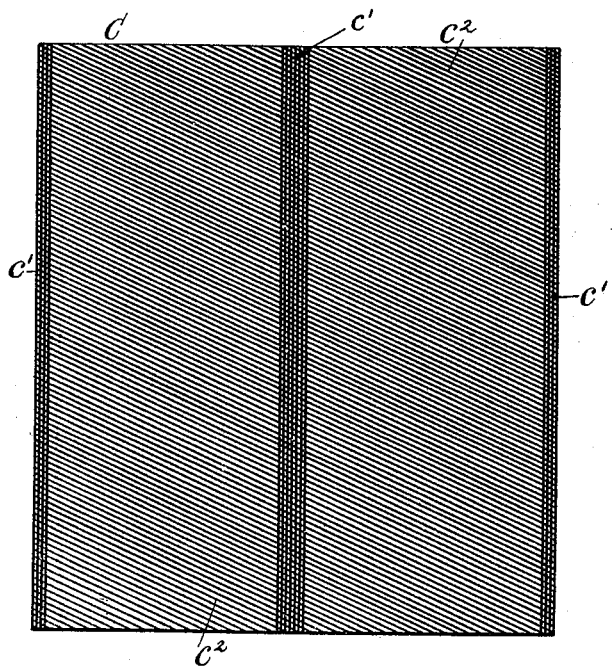
Figure 4:
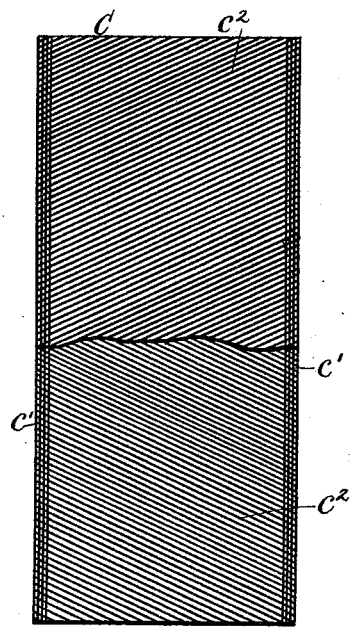
Figure 5:
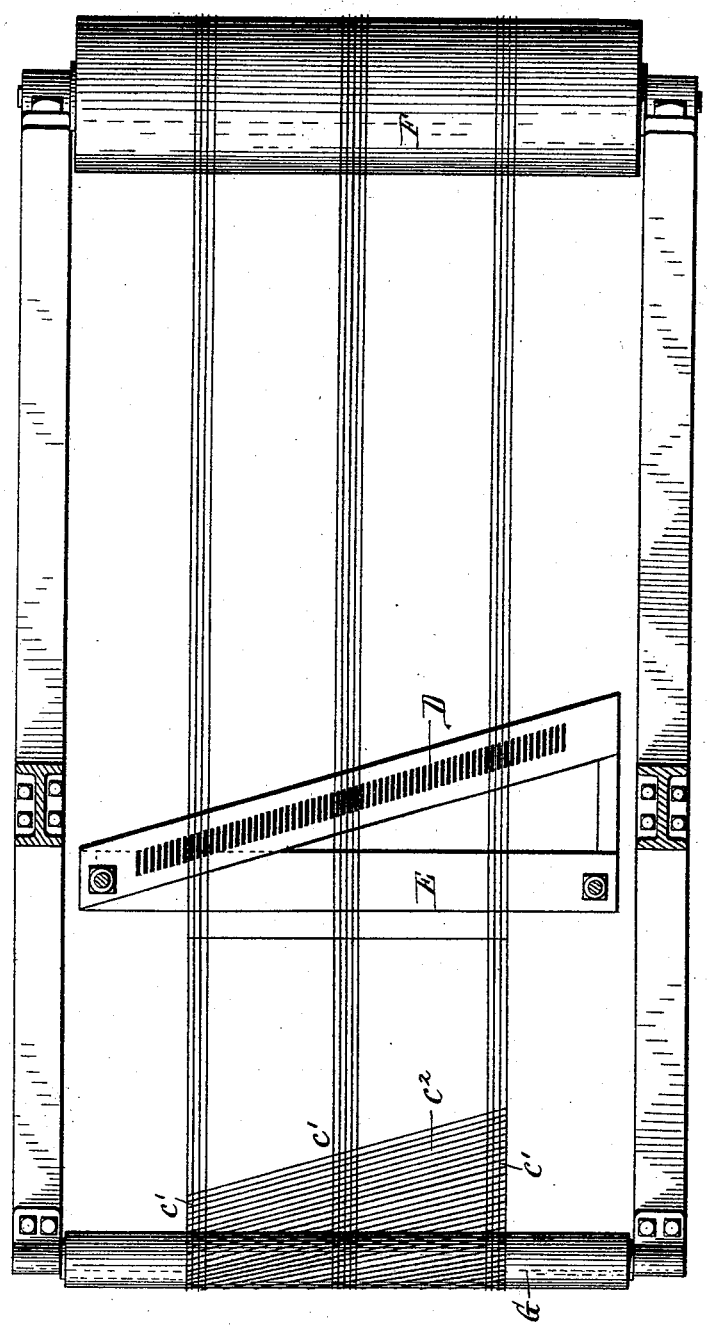

In the accompanying drawings consisting of two sheets:—Figure 1 is a cross section of a pneumatic tire provided with my improved lining or reinforcing fabric. Fig. 2 is a view of a piece of the fabric before the same is doubled to complete it. Fig. 3 is a perspective view of the fabric, partly folded. Fig. 4 is a view of a piece of the completed fabric, with a portion of its upper ply cut away to show the opposite directions of the diagonal weft threads. Fig. 5 is a horizontal section of a loom which may be employed for weaving the lining, some of the operative parts being omitted.

Like letters of reference refer to like parts in the several figures.

A represents the usual inflatable air tube of the tire.

B is the surrounding cover or sheath and C the reinforcing fabric or lining applied to its inner side. This lining consists of two or more plies, layers or thicknesses, each composed of longitudinal selvages or marginal supporting threads $c'$ and diagonal weft or filling threads $c^2$, there being no warp threads in the body portion of either of the plies. The diagonal weft threads of each ply are parallel and extend from one selvage to the other, and the weft threads of one ply cross those of the other ply, without, however, being interwoven therewith, whereby the weft threads of either ply are free to yield under strain to a limited extent, independently of the corresponding threads of the other ply. The two plies are united only at their edges or marginal portions by one or more rows of stitches, or by any other suitable means. This lining is preferably vulcanized to the inner surface of the rubber sheath or cover by any common or suitable method. The thin rubber film thus incorporated with the lining, fills the spaces between the weft threads, and while uniting the threads of both plies allows the same to yield freely lengthwise of the tread when the tire is indented by passing over an obstruction.

As the weft threads of each layer of the lining are unrestrained by warp threads and are not interwoven with the weft threads of the other layer, they have greater freedom of movement than those of a fabric which are interwoven with warp threads, and as the diagonal threads of the two plies intersect, no spaces of sufficient size to allow the inflatable air tube to squeeze between the threads are formed, thus obviating cutting of the tube by these threads. The oblique intersection of the weft threads causes one set of the same to counteract the other, equalizing the strain across the tread of the tire. The lining can be woven in sheets or strips of any desired width and it can therefore be applied to an open sided or "clinch" tire, thus permitting the convenient removal of the inclosed air tube without disturbing the lining, which is not possible with a tire having a spirally wound reinforcement. A pneumatic tire having this improved lining thus combines the advantages of a tire having a spirally wound lining with the advantages of a clinch tire, while avoiding the disadvantages of the reinforcing fabrics heretofore employed.

This improved lining may be woven upon an ordinary loom without necessitating any changes in the operative parts, except in the arrangement of the reed. This, instead of being parallel with the lathe, should be placed obliquely thereto, as shown in Fig. 5, the letter D indicating the reed, E the lathe, F the yarn beam and G the cloth beam. The other parts of the loom are not shown as they remain unaltered. By this arrangement one end of the reed stands in advance of the other and the weft threads are therefore crowded forward farther at one end than at the other and caused to extend obliquely from one selvage to the other. These selvages are formed by stringing groups of longitudinal threads in the loom in a common manner, the weft threads being interwoven with the selvages only at their end portions.

In manufacturing the lining, its plies are woven singly. I prefer to weave a single strip, twice the width of the completed lining as shown in Fig. 2, and then double the same lengthwise in the middle, as shown in Figs. 3 and 4, whereby the weft threads of one fold are caused to cross those of the other fold. In this case a group of intermediate longitudinal threads is also woven in the middle of the strip, as shown in Fig. 2, so as to form a selvage at the doubled edge of the strip.

It is obvious that instead of weaving a strip twice as wide as the finished lining a sheet as wide as the capacity of the loom may be woven at one operation, with groups of intermediate selvage threads disposed at regular intervals, corresponding to the width of the finished lining. When thus woven the sheet may be cut up on the lines of the intermediate selvages into strips of the proper width.

If desired the diagonal fabric may be woven in narrow strips no wider than the completed lining and two or more of these strips may then be superposed in such a manner that the weft threads of the adjacent strips intersect, after which they may be sewed or otherwise united at their selvages.

My improved reinforcing fabric is particularly useful for pneumatic tires, but it is also applicable to other elastic articles in which a resilient reinforcing fabric is desirable, such for instance, as rubber hose or tubing.

In the drawings, the fabric is represented as having two plies, but a greater number may be employed if desired.

I claim as my invention—

1. A sheath or cover for pneumatic tires, having a lining composed of superposed plies of warpless fabric, each ply consisting of marginal selvages and loose weft threads running diagonally from one selvage to the other and inter-woven with said selvages, the diagonal threads of one ply crossing the diagonal threads of the other ply without being interwoven therewith, substantially as set forth.

2. A sheath or cover for pneumatic tires, provided with a lining composed of a doubled strip of warpless fabric having marginal selvages, an intermediate selvage, and loose weft threads running diagonally from one marginal selvage to the other, whereby, upon doubling said strip, the weft threads of one ply cross the corresponding threads of the other ply, substantially as set forth.

Witness my hand this 16th day of December, 1893.

WILLARD A. WARREN.

Witnesses:
M. F. WARREN,
CARL F. GEYER.